US011150470B2

(12) United States Patent
Price et al.

(10) Patent No.: US 11,150,470 B2
(45) Date of Patent: Oct. 19, 2021

(54) INERTIAL MEASUREMENT UNIT SIGNAL BASED IMAGE REPROJECTION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US); Brent Michael Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/736,573

(22) Filed: Jan. 7, 2020

(65) Prior Publication Data

US 2021/0208390 A1   Jul. 8, 2021

(51) Int. Cl.
| G02B 27/00 | (2006.01) |
| G02B 27/01 | (2006.01) |
| G06F 3/00 | (2006.01) |
| G06F 3/01 | (2006.01) |
| G06T 19/00 | (2011.01) |

(52) U.S. Cl.
CPC ..... *G02B 27/0093* (2013.01); *G02B 27/0172* (2013.01); *G06F 3/005* (2013.01); *G06F 3/012* (2013.01); *G06F 3/013* (2013.01); *G06T 19/006* (2013.01); *G02B 2027/014* (2013.01); *G02B 2027/0138* (2013.01); *G02B 2027/0187* (2013.01)

(58) Field of Classification Search
CPC ............ G02B 27/0093; G02B 27/0172; G02B 2027/0138; G02B 2027/0187; G02B 2027/014; G06T 19/006; G06F 3/012; G06F 3/005; G06F 3/013
See application file for complete search history.

(56) References Cited

U.S. PATENT DOCUMENTS

| 9,514,571 B2 | 12/2016 | Williams et al. |
| 9,897,805 B2 | 2/2018 | Stafford et al. |

(Continued)

FOREIGN PATENT DOCUMENTS

WO   2016191467 A1   12/2016

OTHER PUBLICATIONS

Outhard, David A., "Viewing model for virtual environment displays", In Journal of Electronic Imaging, vol. 4, Issue 4, Oct. 1995, pp. 413-420.

(Continued)

*Primary Examiner* — Brent D Castiaux
(74) *Attorney, Agent, or Firm* — Alleman Hall Creasman & Tuttle LLP

(57) ABSTRACT

A head-mounted display is presented. The head-mounted display includes an inertial measurement unit (IMU), one or more displays and a controller. The controller is configured to establish a reprojection plane for displaying imagery on the one or more displays. Based on output from the IMU, the position and orientation of the HMD relative to the reprojection plane is determined. Image data is then reprojected to the displays. A depth treatment is applied to each of a plurality of locations on the displays based on the determined position and orientation of the HMD relative to the reprojection plane.

20 Claims, 6 Drawing Sheets

(56) References Cited

U.S. PATENT DOCUMENTS

| | | | |
|---|---|---|---|
| 10,054,796 B2 | 8/2018 | Bickerstaff et al. | |
| 10,078,377 B2 | 9/2018 | Balan et al. | |
| 2011/0109619 A1 | 5/2011 | Yoo et al. | |
| 2013/0063549 A1 | 3/2013 | Schnyder et al. | |
| 2015/0002507 A1* | 1/2015 | Ambrus | G06T 19/00 |
| | | | 345/419 |
| 2016/0232715 A1* | 8/2016 | Lee | A63F 13/211 |
| 2016/0246061 A1* | 8/2016 | Bickerstaff | H04N 5/23258 |
| 2016/0262608 A1* | 9/2016 | Krueger | G06T 19/006 |
| 2017/0374341 A1* | 12/2017 | Michail | G06T 15/06 |
| 2019/0037194 A1* | 1/2019 | Schmidt | G01S 17/89 |
| 2019/0188895 A1* | 6/2019 | Miller, IV | G06K 9/00604 |
| 2019/0235622 A1* | 8/2019 | Tu | G06F 3/01 |

OTHER PUBLICATIONS

Santell, Jordan, "Portals with Asymmetric Projection", Retrieved from: https://jsantell.com/portals-with-asymmetric-projection, May 13, 2019, 10 Pages.

"International Search Report and Written Opinion Issued in PCT Application No. PCT/US20/060931", dated Feb. 10, 2021, 11 Pages.

* cited by examiner

INERTIAL MEASUREMENT UNIT SIGNAL BASED IMAGE REPROJECTION

BACKGROUND

Head-mounted display devices may include see-through displays that enable augmented or mixed reality wherein virtual images are presented on the see-through display so as to appear alongside real-world objects visible through the display. Outward-facing cameras positioned on the head-mounted display enable the environment to be imaged, and for spatial information regarding the environment to be considered when generating and presenting virtual images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display is presented. The head-mounted display includes an inertial measurement unit (IMU), one or more displays and a controller. The controller is configured to establish a reprojection plane for displaying imagery on the one or more displays. Based on output from the IMU, the position and orientation of the HMD relative to the reprojection plane is determined. Image data is then reprojected to the displays. A depth treatment is applied to each of a plurality of locations on the displays based on the determined position and orientation of the HMD relative to the reprojection plane.

DETAILED DESCRIPTION

Head-mounted displays (HMDs) may be used to present virtual reality or augmented reality to users. Such systems often incorporate outward-facing cameras to view and record the environment of the user. The resulting image data may then be displayed to the user, using near-eye displays, for example. However, particularly for augmented reality applications where the user views their environment through a see-through display, the outward-facing cameras are not telecentric with the user's eyes. The image data must be reprojected in order to be positioned accurately within the user's field of view.

The outward-facing cameras record 2D image data that can be unprojected into a 3D world and then reprojected onto a 2D display panel. However, the 2D image data may not inherently include depth information. For example, thermal cameras are particularly expensive, and there may only be a single outward-facing camera. Even for devices with multiple 2D cameras and/or additional depth imaging devices, processing this data to generate depth data may be computationally expensive, error prone, and may not provide usable data to influence the reprojecting of image data in real time. In particular, the image data, be it generated from onboard imaging sensors or otherwise, must be projected to both the right and left eye of the user by assigning correct pixels to right and left display portions to provide appropriate stereo depth treatment.

As such, there are inherent challenges with taking a single 2D image and projecting it to a user in stereo in a meaningful way without any 3D information about the environment. When single camera information is presented to both eyes, the user incorrectly perceives the object within the environment. The camera(s) are offset from the user's eyes, resulting in parallax. With no inherent depth information, that data must be generated or approximated to encode the image data in such a way as to convey depth. Further, different objects and/or portions of the same object may exist at different depths from the user, so multiple depths may have to be assigned to different display pixels per frame. Perfect depth recreation would involve the ability to assign unique depths to each display pixel. However, as described, this is oftentimes an impractical solution, especially without inherent depth data for received image data.

Figure 1:
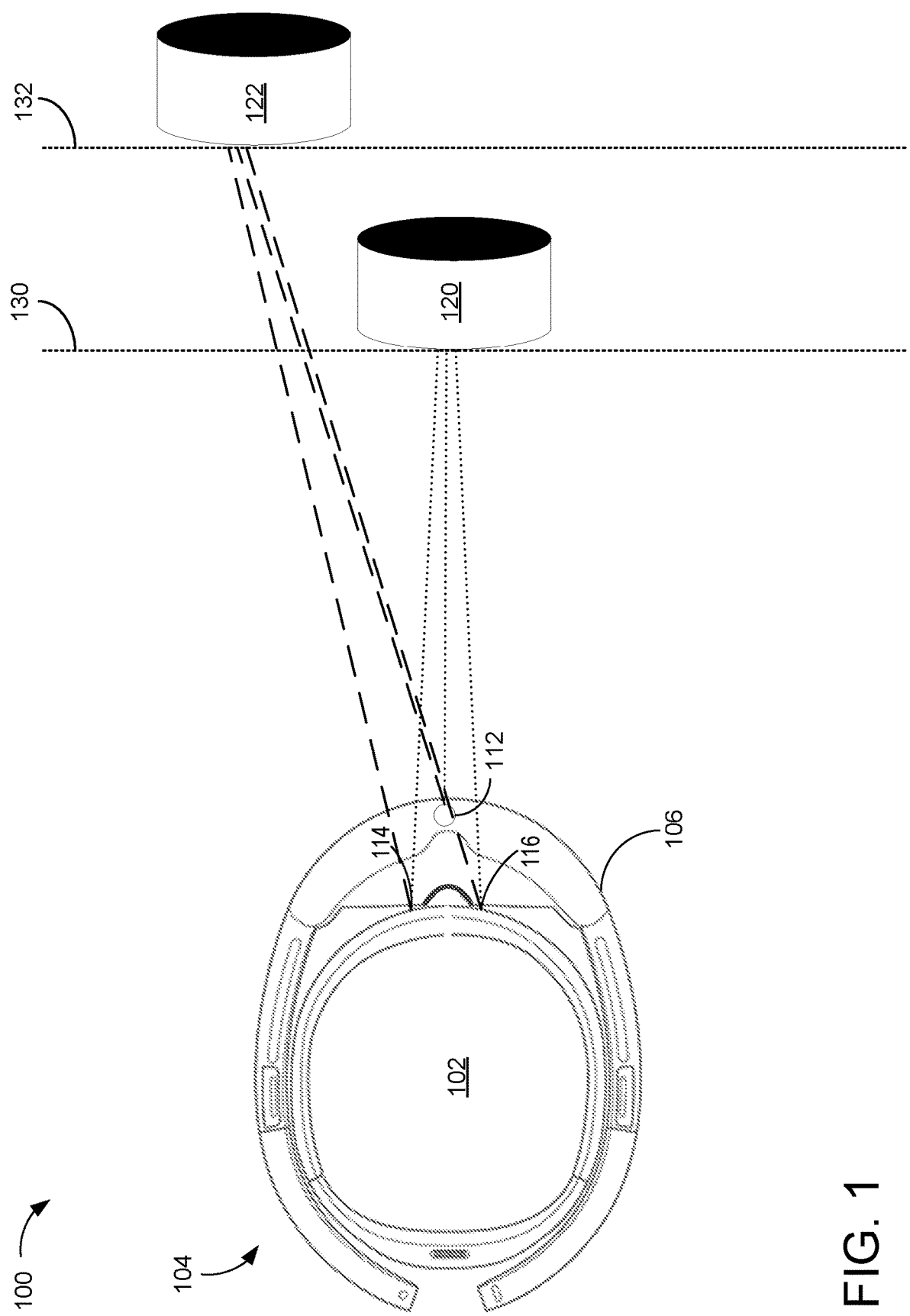
FIG. 1 shows an example wearable computing system within an environment.

One solution to assigning depth data is to use reprojection planes, which may be thought of as virtual display screens located at a given depth. The depth may be simulated through offsets in the relative position of pixels in the left and right eye display portions. FIG. 1 shows an example environment 100 including a user 102 and a computing system 104. Computing system 104 includes a head-mounted display system 106. Head-mounted display system 106 includes a single outward-facing camera 112, as well as left (114) and right (116) near-eye displays.

Environment 100 includes objects 120 and 122. Object 120 is positioned at a distance of 2 m from user 102 and is centered between user 102's left and right eyes. Object 122 is positioned at a distance of 3 m from user 102 and is closer to user 102's left eye.

The relative positioning of objects 120 and 122 thus underlies different visual properties that need to be accounted for in reprojecting image data captured by outward-facing camera 112. If a single reprojection plane 130 is placed at 2 m from near-eye displays 114 and 116, the reprojection of object 120 will align perfectly with the actual object 120. However, if image data of object 122 is also reprojected at reprojection plane 130, there will be discrepancies between the reprojected image data and the real-world object. For example, the object may be misaligned or displaced. The texture of the real object and the displayed object may not align. This will also occur if images of actual object 120 are reprojected at reprojection plane 132 at 3 m.

As will be appreciated from the above, many of the examples herein will involve an outward-facing camera on the HMD. The outward-facing camera captures imagery which may then reprojected with appropriate stereo treatment using one or more reprojection planes. It will be appreciated, however, that imagery for projection to the HMD display may come from sources other than an outward-facing camera, and such a camera may in some cases be omitted or other vision systems may be employed. Furthermore, the imagery may also be derived from images gathered from two or more outward-facing cameras, where left and right cameras record images for left and right eyes, respectively.

In selecting a reprojection plane, the relative distance between the display and the reprojection plane determines relative positioning of left and right eye images. For example, a reprojection plane placed at an infinite distance will result in effectively parallel rays between the left eye and the object and the right eye and the object. As the reprojection plane moves closer, the angle between these rays increases. As objects move to the left or right of the user, the offset between the image data (assuming the camera is located between the eyes) and each eye becomes greater. Selection of a reprojection plane must also account for parallax and displacement in the X/Y/Z coordinates between the camera and the user's eyes.

For simplicity, a reprojection plane may be set at infinite depth, and thus everything far away will be aligned, but everything close will be displaced. Objects will appear as if floating at infinite depth and parallax would make the object look unusual. For serial display, there is no disparity between the left and right images when the image is reprojected at infinity. That would make the object appear very far away.

Herein, systems and methods are described that enable users to more accurately understand and perceive the real world through reprojected images, using a simple and inexpensive computing technique. An inertial measurement unit (IMU) within the head-mounted display (HMD) may be used to detect the orientation of the user's head and optical sensors relative to gravity. This enables the determination of a position of the HMD relative to an established reprojection plane. For example, the IMU may be used to establish a distance between the HMD and the reprojection plane based on the height of the user. This bounds the depth problem in a way that is fairly accurate and computationally inexpensive.

Image data may then be reprojected to the HMD accurately. In some examples, this image data is captured at the HMD itself. Referring to FIG. 1, there may be one camera 112 that is located between the two near-eye displays 114 and 116. The camera is recording 2D images. In order to correctly show the geometry of real-world objects in the displays, some information regarding the depth of objects at each pixel is assigned based on the orientation of the HMD to the reprojection plane based on IMU measurements. For each pixel of the display, it is known that the object lies on a 3D ray that extends from the user's eye through the display to the object. However, the depth information is not available from the simple 2D image data. The distances from the HMD to the reprojection plane may be used to generate a gradient of depth values, allowing for pixels to be projected to both displays at a correct depth, and for both X and Y coordinates to be supplied correctly.

Figure 2:
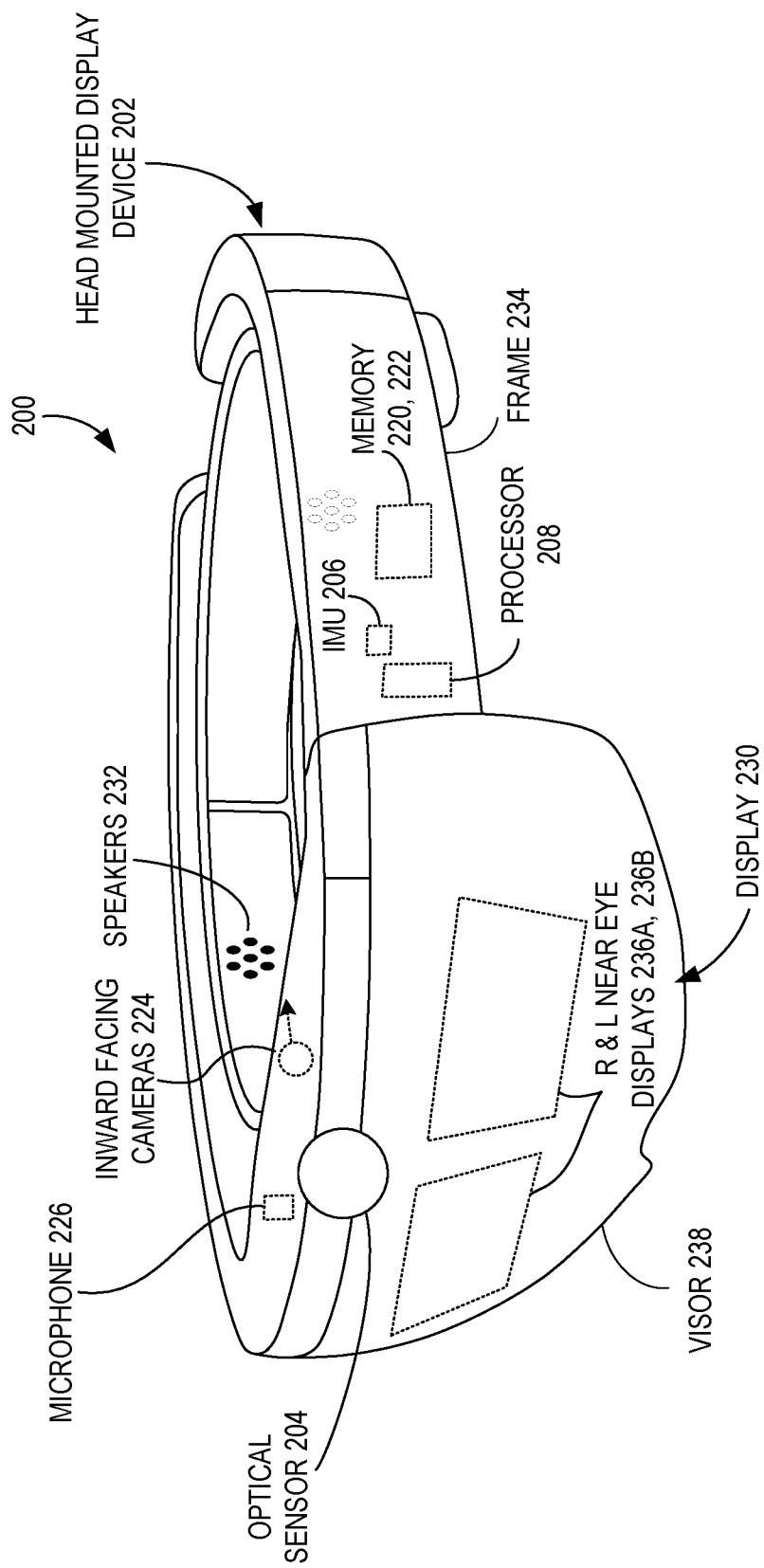
FIG. 2 is an example implementation of the computing system of FIG. 1.

FIG. 2 is an example implementation of the computing system 104 according to an example implementation of the present disclosure. In this example, as in FIG. 1, the computing system 200 is integrated into and/or implemented as an HMD device 202. In one example implementation, the computing system 200 may include one or more optical sensors, such as the depicted optical sensor 204 that may be a camera positioned centrally on an upper portion of HMD device 202 as shown in FIG. 2. Optical sensor 204 may be a RGB camera and/or low-light camera such as an IR camera configured for night vision. In some examples, optical sensor 204 may include a thermal camera, such as those configured to receive and detect IR light in a range of 8000 nm to 15,000 nm. It will be appreciated however that cameras included in the computing system 200 may be sensitive to various ranges of electromagnetic radiation as preferred by designers of the computing system 104, such as Ultra-Violet light, visible light, near infrared light, or other suitable frequencies.

In some examples, a depth detection system (not shown) may also be included in the computing system 200 and integrated into the HMD device 202. The depth detection system may also include components such as a pair of stereo cameras and/or a pair of stereo low-level light cameras. Alternatively, the depth detection system may include a single camera and an inertial measurement unit (IMU) 206. Other depth detection systems may include a single camera and a light projector, a pair of cameras and a light projector, and/or a laser light source and a camera. However, active stereo methods of depth detection may additionally process light projected by a projector that may be received at right and left cameras. A structured light method of depth detection may also be integrated into the computing system 200, in which case a projector and one camera to receive reflected projected light may be utilized. If a time-of-flight method of depth detection is preferred, the HMD device 202 may include a laser light source and corresponding sensor such as an IR laser in addition to a camera to receive reflected laser light. In another configuration, IMU 206 and a single camera may be used to detect depth.

The example computing system 200 includes a processor 208 and associated storage, which in FIG. 2 includes volatile memory 220 and non-volatile memory 222. The processor 208 is configured to execute instructions stored in the storage, using volatile memory 220 while executing instructions belonging to various programs and non-volatile memory 222 for storage of the programs. Other sensors that may be included in the computing system 200 as embodied in the HMD device 202 may be inward-facing cameras 224 to identify the position and orientation of each of a user's eyes and subsequently generate eye-tracking data. Also, a microphone 226 may receive natural language (NL) input from a user of the HMD device 202.

IMU 206 may be implemented in the HMD device 202 as described above, which may include accelerometers, gyroscopes, and/or a compass that can detect, for example, a 6 degree of freedom (6 DOF) position and orientation of the HMD device 202. Processor 208 may further refine the 6 DOF output of IMU 206 using visual tracking systems that search for movement of identified visual features in a series of images captured by optical sensor 204 and/or other cameras to generate an estimate of the relative movement of the HMD device 202 based upon the movement of these visual features within successive image frames captured by optical sensor 204 over time. It will be appreciated that components such as the microphone 226 and/or one or more optical sensors 204 may be integrated with the HMD device 202, or provided separately therefrom. It will be further appreciated that other types of sensors not displayed in FIG. 2 may be included in the computing system 200.

Figure 6:
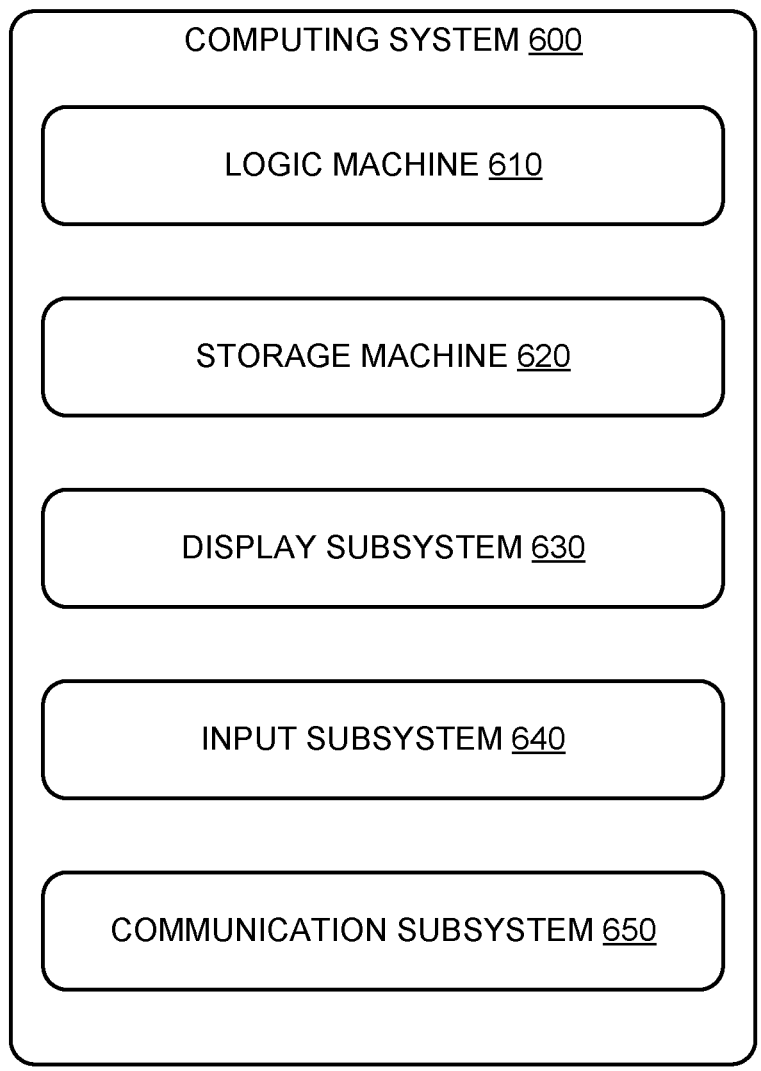
FIG. 6 is an example computing environment, which may be used to implement the computing system of FIG. 1.

A display 230 may be integrated with the HMD device 202, or optionally provided separately. Speakers 232 may also be included in the HMD device 202, or also provided separately. It will be appreciated that electronic and computing components may be connected via a bus. Furthermore, FIG. 6 depicts various computing system components that may correspond to the components of FIG. 2, and the descriptions of those components in FIG. 6 may therefore apply to such corresponding components in FIG. 2.

As shown in FIG. 2, the processor 208, volatile and non-volatile memories 220, 222, inward-facing cameras 224, optical sensor 204, microphone 262, IMU 206, and speakers 232 may be incorporated within a housing of HMD device 202 as shown. HMD device 202 may include a mounting frame 234 that at least partially encircles the head of a user, and the display 230 may include a pair of right and left near-eye displays 236A and 236B. The near-eye displays 236A and 236B may be positioned behind a visor 238 through which a user may observe the physical surroundings in an augmented reality (AR) system. It will be appreciated that the near eye displays 236A and 236B and visor 238 may be at least partially transparent, enabling the user to see through these components to view the real environment, at least when content is not opaquely displayed on the near-eye displays 236A and 236B.

While described predominantly in terms of augmented reality systems with see-through displays, the systems and methods described herein are equally applicable to virtual reality systems and other mixed reality systems that with more opaque display units. Similarly, while described predominantly with reference to head-mounted display units that include a single, centered optical sensor or camera, the systems and methods described are equally applicable head-mounted display units that include offset cameras and/or multiple cameras, including depth cameras in scenarios where processing speed and power limit the amount of depth information can be processed to enable near-real time image reprojection. Additionally, one or more additional computing devices, such as cloud computing devices may be communicatively coupled to the head-mounted display system in order to process image data and/or otherwise provide processing bandwidth to execute the described method and processes.

Figure 3:
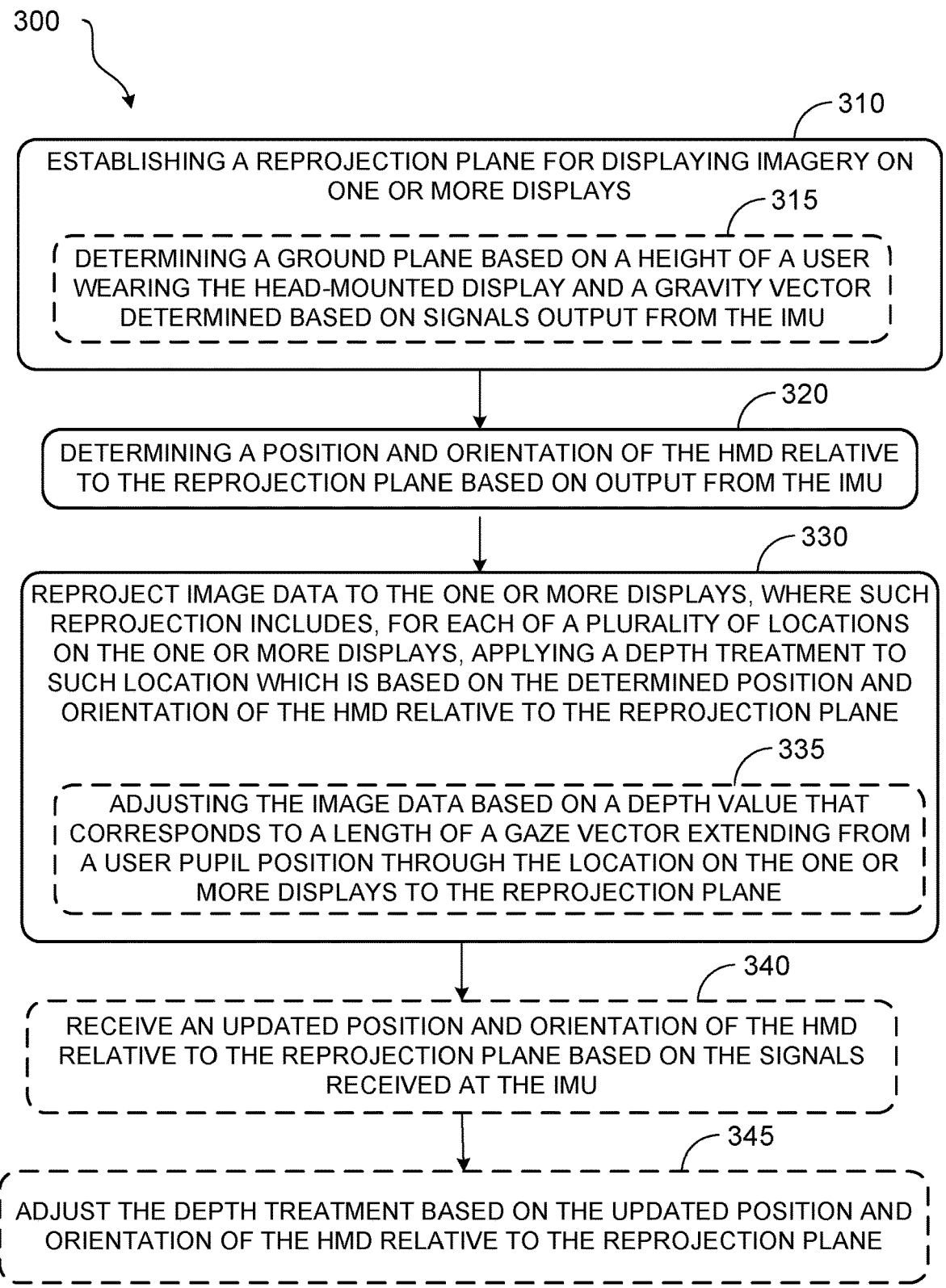
FIG. 3 is an example method for reprojecting image data based on output received from an inertial measurement unit within a head-mounted display.

FIG. 3 depicts an example method 300 for reprojecting image data based at least in part on data received from the IMU of a head-mounted display. Method 300 may be implemented by a computing device that includes a head-mounted display such as computing system 200 described with regard to FIG. 2. Such a head-mounted display may include at least an outward-facing camera, an inertial measurement unit (IMU), one or more displays, such as a stereo display, and a controller.

At 310, method 300 includes establishing a reprojection plane for displaying imagery on the one or more displays. The reprojection plane may be established by any suitable means. The reprojection plane may be a Euclidian plane that exists in virtual 6 DoF space relative to the HMD. The reprojection plane may be world-locked. As described further herein, in some examples two or more reprojection planes may be established. Each reprojection plane may be considered to be a virtual display screen onto which imagery is reprojected for display at the display screen of the HMD. In some examples, the reprojection plane is coincident with a ground plane.

As such, optionally, at 315, method 300 may include determining a ground plane based on a height of a user wearing the head-mounted display and a gravity vector determined based on output from the IMU. Additionally or alternatively to determining a height of the user, method 300 may include determining a height of the outward-facing camera. The IMU may be configured to determine a direction of a gravity vector through any variety of methods and approximations. The orientation of the outward-facing camera may then be calibrated based on the direction of gravity. The gravity vector may be used to assign a tilt to the ground plane, and thus to the reprojection plane.

Determining a height of the outward-facing camera and/or HMD may be accomplished in any suitable way. For example, user preferences, user data, and/or other user input may indicate a standing height of the user, and the position of the outward-facing camera/HMD may be determined based on the user's height. In some examples, the height of the outward-facing camera/HMD may be determined based on approximations or assumptions of the user. For example, a population average height for a male human user is approximately 1.7 m, and the camera/HMD can be assumed to be approximately 1.7 m above the ground given that the user is standing on a flat plane. In some examples, height may be determined empirically. For example, image data from the outward-facing camera that includes known heights, distances, and/or perspectives may be used to determine the height of the outward-facing camera/HMD. The height of the user may, for example, also be derived from a barometer included in an IMU. In some examples, camera rotation may be gauged to calibrate the camera for the gaze angle of the outward-facing camera as compared to the gaze angle of the user's eyes. For some devices, the camera angle relative to the user's eyes may be known (e.g., 10 degrees downwards). In examples where multiple cameras and/or depth cameras are included in the head-mounted display, depth measurements may be used to inform the height of the outward-facing camera/HMD.

At 320, method 300 includes determining a position and orientation of the HMD relative to the reprojection plane based on output from the IMU. As described with regard to FIG. 2, the IMU may include accelerometers, gyroscopes, and/or a compass that can detect, for example, a 6 degree of freedom (6 DOF) position and orientation of the HMD device relative to the reprojection plane. Movement of the HMD may impact what parts of the reprojection plane are being viewed through the display, and thus the position and orientation of the HMD relative to the reprojection plane informs the depth values assigned to the pixels on the display, e.g., the distance of a ray extending from the user's pupil through that pixel to the reprojection plane.

At 330, method 300 includes reprojecting image data to the display, where such reprojection includes, for each of a plurality of locations on the display, applying a depth treatment to such location which is based on the determined position and orientation of the HMD relative to the reprojection plane. In other words, based on the position and orientation of the HMD, it can be determined which part of the reprojection plane is being viewed. For example, if the user is looking straight down at portions of the reprojection plane that are directly below the user, this will produce one depth treatment for the pixels based on relatively short distances. If the user is looking far away, and thus viewing a distal part of the reprojection plane, this may entail a different depth treatment for the pixels based on relatively long distances. In some examples, wherein the one or more displays include a stereo display, the depth treatment may be a stereo depth treatment.

Optionally, at 335, method 300 includes adjusting the image data based on a depth value that corresponds to a length of a gaze vector extending from a user pupil position through the location on the display to the reprojection plane.

Figure 4A:
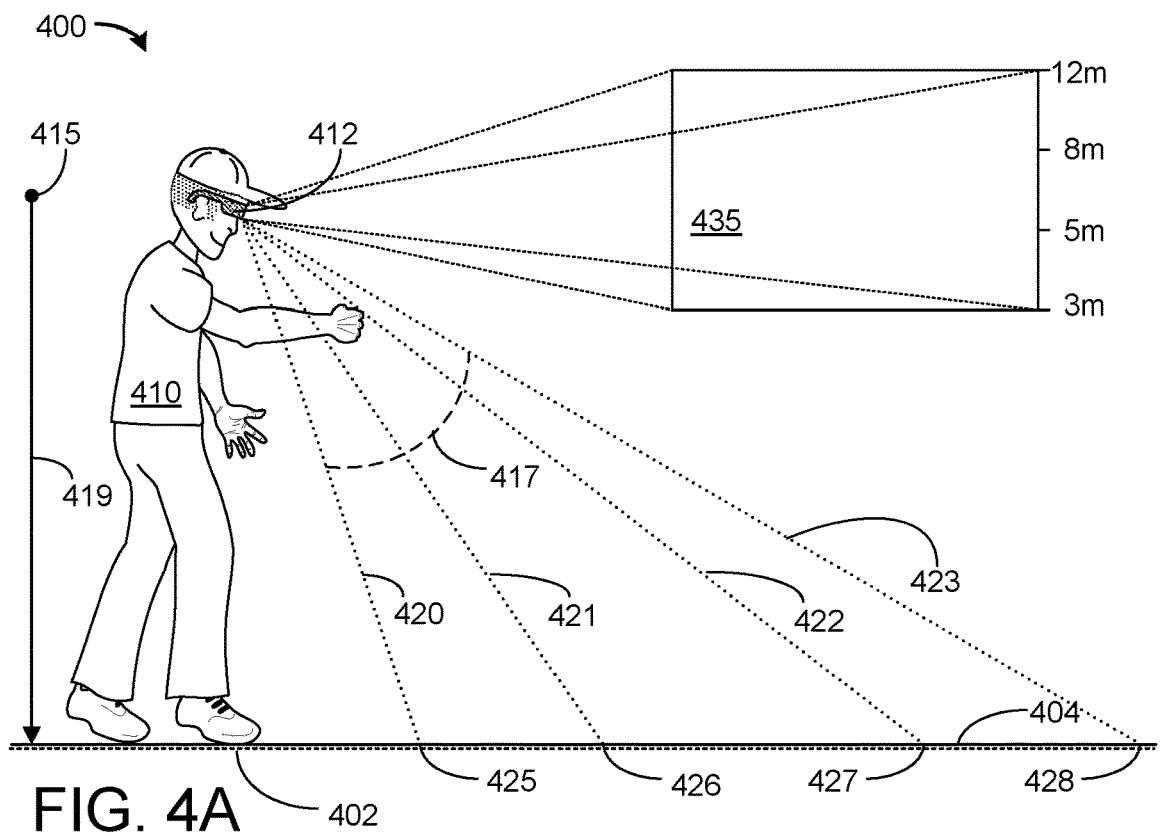
FIG. 4A shows a user relative to a reprojection plane within an environment.

As an illustrative example, FIG. 4A depicts an example environment 400 including a reprojection plane 402 that is coincident with a ground plane 404. A user 410 is shown wearing a head-mounted display 412. Head-mounted display 412 has an associated height 415 and field of view (FOV) 417. An IMU within HMD 412 may be used to determine a gravity vector 419, and thus be used to spatially orient HMD 412 to reprojection plane 402 and ground plane 404, as well as to provide an initial depth value between HMD 412 and reprojection plane 402.

Four rays (420, 421, 422, and 423) are shown projected from an eye of user 410 through a see-through display screen of HMD 412. Each ray intersects with reprojection plane 402 at a ground point (425, 426, 427, and 428, respectively). Based on height 415 and the orientation of HMD 412, distances may be determined for each ray. As shown in FIG. 4A, ground point 425 may be determined to be 3 m from HMD 412, ground point 426 may be determined to be 5 m from HMD 412, ground point 427 may be determined to be 8 m from HMD 412, and ground point 428 may be determined to be 12 m from HMD 412. As such, a stereo depth treatment 435 may be generated that includes a gradient of distances that correspond to the distance from each display pixel to the corresponding point of the environment based on the orientation and height of HMD 412 relative to reprojection plane 402. Additional contextual information, such as changes in elevation, user cues, etc. may be used to inform this treatment. For simplicity, a mono treatment is shown, as if the user is viewing ground plane 404 at a completely centered position. However, stereo treatments may be applied wherein the distances to each eye are calculated individually based on the orientation and height of HMD 412.

Returning to FIG. 3, at 340, method 300 may optionally include receiving an updated position and orientation of the HMD relative to the reprojection plane based on output from the IMU. For example, as the user's head rotates or otherwise changes position relative to the reprojection plane, the IMU may output signals received at the accelerometers, gyroscopes, etc. indicating the extent to which the HMD has moved relative to the reprojection plane.

At 345, method 300 includes adjusting the depth treatment based on the updated position and orientation of the HMD relative to the reprojection plane. Each ray extending from the user's eye through a display pixel display to the reprojection plane may have an updated length, and thus an updated depth treatment applied to reproject image data for display. Even if the height of the HMD does not change, rotation of the user's head may change the length of these rays. Tilting of the user's head to one side may generate imbalanced distances between the eyes, and may thus result in stereo treatment that is unique for each eye.

Figure 4B:
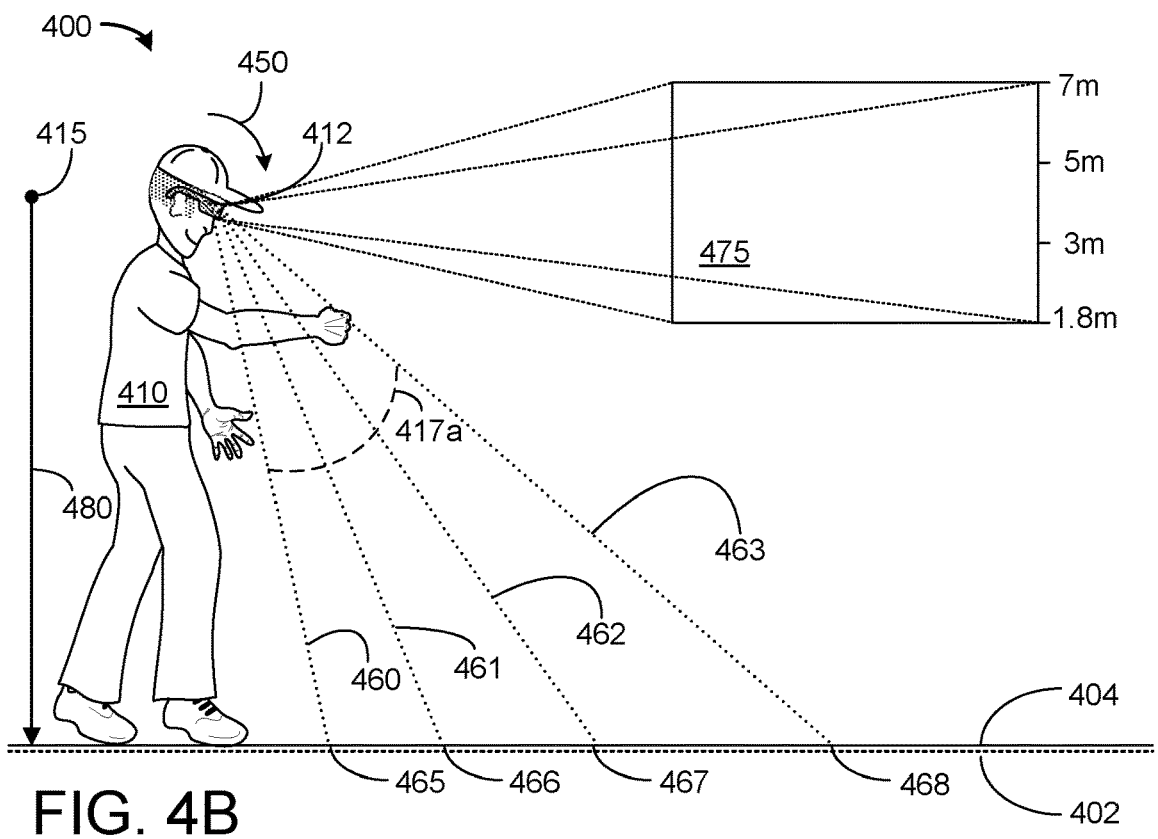
FIG. 4B shows a user at an adjusted position relative to a reprojection plane within an environment.

As an example, FIG. 4B shows downward rotation 450 of head-mounted display 412 relative to reprojection plane 402. This movement causes a shift in the FOV (417*a*) of the display, which changes the relative positions and distances of points of the ground plane and horizon plane relative to the outward-facing camera. In this example, four rays (460, 461, 462, and 463) are shown projected from an eye of user 410 through a see-through display screen of HMD 412. Rays (460, 461, 462, and 463) may be considered to correlate with rays (420, 421, 422, and 423) in terms of which display pixel is intersected. Each ray intersects with reprojection plane 402 at a ground point (465, 466, 467, and 468, respectively). Based on height 415 and the orientation of HMD 412, distances may be determined for each ray. As shown in FIG. 4A, ground point 465 may be determined to be 1.8 m from HMD 412, ground point 466 may be determined to be 3 m from HMD 412, ground point 467 may be determined to be 5 m from HMD 412, and ground point 468 may be determined to be 7 m from HMD 412. As such, an updated stereo depth treatment 475 may be generated based on the updated orientation and height of HMD 412 relative to reprojection plane 402.

While stereo depth treatments 435 and 475 are indicated with discrete distances, it should be understood that a continuous image warp is applied to the camera in many examples. Such a warp is dependent on the height and orientation (e.g., rotation relative to ground plane) of the HMD.

In some examples, the HMD may include one or more outward-facing cameras, and may thus receive image data of the environment from the outward-facing camera. Image data including perspective views of an environment may be captured at a predetermined frame rate. As described with regard to FIG. 2, the outward-facing camera may include one or more cameras configured to image the environment at a predetermined range of frequencies. The field of view of the camera, along with the height and orientation of the HMD may be used to annotate the received image data relative to the reprojection plane. The received image data of the environment may then be reprojected to the stereo display based on the determined position and orientation of the HMD relative to the reprojection plane. Any known methods of reprojection may be used wherein 2D image data is unprojected into 3D data based on the reprojection plane distance for each pixel, then reprojected into 2D for presentation on the stereo display screen. Distances and pixels for left and right displays may similarly be calculated based on estimated distances between the object and each eye. In other words, for each display pixel, different amounts of correction may be applied for camera offset and for stereo imaging, based on the position of the pixel relative to the reprojection plane.

In some examples, the received image data of the environment may be used to adjust a relative position of the reprojection plane to the HMD, and thus adjust the stereo treatment of display imagery. For example, the received image data of the environment may include environmental cues that indicate a changing topology of the ground plane, and thus necessitate recalibrating the position of the reprojection plane. As described further herein, in some examples multiple reprojection planes are established within an environment. Image data of the environment may be used to discern these reprojection planes and to adjust the stereo treatment of display imagery based on the relative orientation of the HMD to each reprojection plane. In particular, the stereo treatment may be adjusted for one or more locations on the stereo display.

In some examples, two or more reprojection planes may be established. For example, as described, a first reprojection plane may be established that is based on and/or coincident with a ground plane. A second reprojection plane may be established that is perpendicular to the ground plane, such as a wall plane for an indoor environment or a horizon plane for an outdoor environment. In some examples, this second reprojection plane may have a fixed distance from the HMD, such that all rays extending from the user's eye to the second reprojection plane are assigned equal values (e.g., 5 m for a wall plane, infinity for a horizon plane). In other cases, movement of the HMD is tracked relative to the second reprojection plane, such that the user may move closer or farther away from the second reprojection plane.

By establishing multiple reprojection planes, the HMD is enabled to approximate depth and contours of the real world. In some examples, the relative positions of the first and second reprojection planes may be informed in part based on received image data of the environment. This may inform positioning of walls, floors, ceilings, etc. In some examples, the position of a horizon plane may be determined based on portions of the image data that do not include the ground floor. For rays that do not intersect the ground plane, these rays may be assumed to intersect with the horizon plane, a distal wall plane, etc. As such, the orientation of the horizon plane or wall plane may be determined in part by the first rays that do not intersect the ground plane. In other cases, ground and wall reprojection planes may be established based on information other than that gathered by imaging devices. For example, a wall reprojection plane may be established in all cases at a fixed distance from the user, for example based on empirical observation that the distance provides desirable depth treatments for rendered imagery.

Figure 5A:
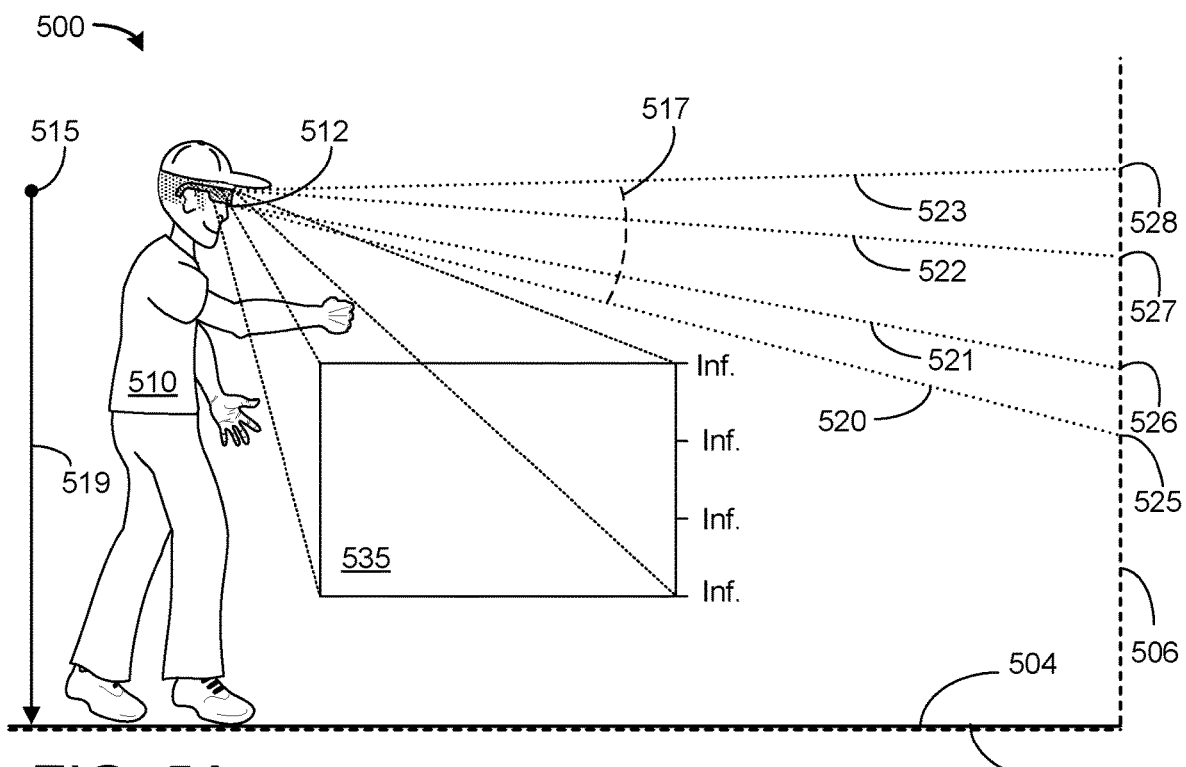
FIG. 5A shows a user relative to two reprojection planes within an environment.

As an example, FIG. 5A depicts an example environment 500 including a first reprojection plane 502 that is coincident with a ground plane 504 and a second reprojection plane 506 that is perpendicular to first reprojection plane 502. Second reprojection plane 506 may be considered a horizon plane that is positioned at infinite distance from user 510 (i.e., effectively an infinite distance for purposes of human vision optics/focus). User 510 is shown wearing a head-mounted display 512. Head-mounted display 512 has an associated height 515 and field of view (FOV) 517. An IMU within HMD 512 may be used to determine a gravity vector 519, and thus be used to spatially orient HMD 512 to first reprojection plane 502, ground plane 504, and second reprojection plane 506, as well as to provide an initial depth value between HMD 512 and reprojection plane 502.

Four rays (520, 521, 522, and 523) are shown projected from an eye of user 510 through a see-through display screen of HMD 512. Each ray intersects with second reprojection plane 506 at a horizon point (525, 526, 527, and 528, respectively). A stereo depth treatment 535 may be generated wherein each display pixel (for each eye) is assumed to be at infinite distance to any display imagery.

Figure 5B:
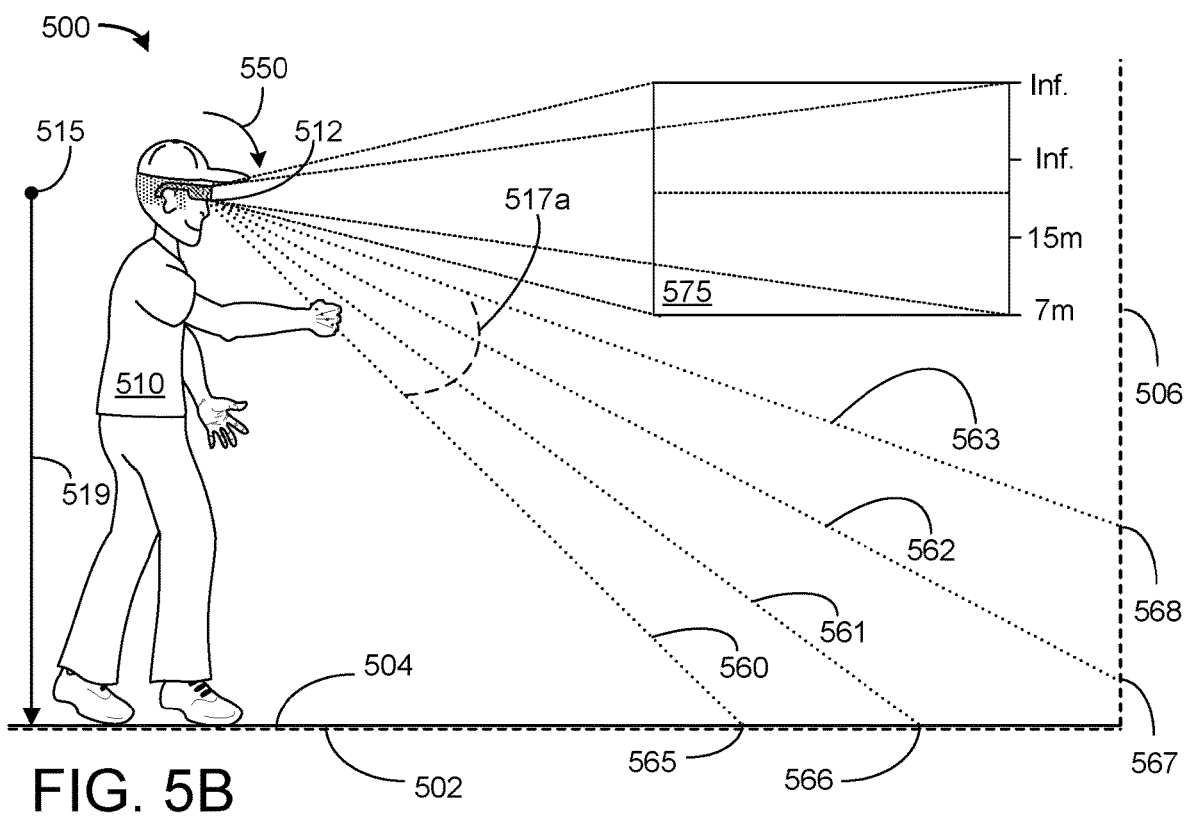
FIG. 5B shows a user relative at an adjusted position to two reprojection planes within an environment.

In some examples, the FOV of the HMD may indicate rays that intersect with more than one reprojection plane. Such an example is shown in FIG. 5B. FIG. 5B shows downward rotation 550 of head-mounted display 512 relative to reprojection planes 502 and 506. This movement causes a shift in the FOV (517a) of the display, which changes the relative positions and distances of points of the ground plane and horizon plane relative to the HMD.

In this example, four rays (560, 561, 562, and 563) are shown projected from an eye of user 510 through a see-through display screen of HMD 512. Rays (560, 561, 562, and 563) may be considered to correlate with rays (520, 521, 522, and 523) in terms of which display pixel is intersected. Rays 560 and 561 intersect with ground points 565 and 566, respectively, while rays 562 and 563 intersect with horizon points 567 and 568, respectively. As such, portions of the stereo-display that lie along rays intersecting the user's eye and the first reprojection plane (e.g., rays 560, 561) get stereo depth treatments based on position and orientation of HMD 512 relative to the first reprojection plane 502, and portions of the stereo-display that lie along rays intersecting the user's eye and second reprojection plane 506 get stereo depth treatments based on position and orientation of HMD 512 relative to the second reprojection plane 506. Stereo depth treatment 575 thus includes stereo depth treatments based on both first reprojection plane 502 and second reprojection plane 506.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random-access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In one example, a head-mounted display (HMD), comprises an inertial measurement unit (IMU); one or more displays; and a controller configured to: establish a reprojection plane for displaying imagery on the one or more displays; determine a position and orientation of the HMD relative to the reprojection plane based on output from the IMU; and reproject image data to the one or more displays, where such reprojection includes, for each of a plurality of locations on the one or more displays, applying a depth treatment to such location which is based on the determined position and orientation of the HMD relative to the reprojection plane. In such an example, or any other example the reprojection plane is additionally or alternatively coincident with a ground plane. In any of the preceding examples, or any other example, the ground plane is additionally or alternatively determined based on a height of a user wearing the HMD and a gravity vector determined based on output from the IMU. In any of the preceding examples, or any other example the height of the user is additionally or alternatively determined based on a user input. In any of the preceding examples, or any other example, the height of the user is additionally or alternatively determined based on a population average height. In any of the preceding examples, or any other example, the height of the user is additionally or alternatively determined based on output from the IMU. In any of the preceding examples, or any other example, applying a depth treatment additionally or alternatively includes, for each such location, adjusting the image data based on a depth value that corresponds to a length of a gaze vector extending from a user pupil position through the location on the stereo display to the reprojection plane. In any of the preceding examples, or any other example, the controller is additionally or alternatively configured to receive an updated position and orientation of the HMD relative to the reprojection plane based on output from the IMU; and adjust the depth treatment for one or more of the locations based on the updated position and orientation of the HMD. In any of the preceding examples, or any other example, the head-mounted display additionally or alternatively comprises an outward-facing camera, and the controller is additionally or alternatively configured to: receive image data of the environment from the outward-facing camera; and reproject the received image data of the environment to the one or more displays based on the determined position and orientation of the HMD relative to the reprojection plane. In any of the preceding examples, or any other example, the controller is additionally or alternatively configured to adjust a position of the reprojection plane relative to the HMD based on the received image data of the environment. In any of the preceding examples, or any other example, the reprojection plane is additionally or alternatively a first reprojection plane, and the controller is additionally or alternatively configured to establish a second reprojection plane. In any of the preceding examples, or any other example portions of the one or more displays that lie along rays intersecting the user's eye and the first reprojection plane additionally or alternatively get depth treatments based on position and orientation of the HMD relative to the first reprojection plane; and portions of the one or more displays that lie along rays intersecting the user's eye and the second reprojection plane additionally or alternatively get depth treatments based on position and orientation of the HMD relative to the first second reprojection plane. In any of the preceding examples, or any other example, the one or more displays additionally or alternatively include a stereo display, and the depth treatment is additionally or alternatively a stereo depth treatment.

In another example, a method for reprojecting image data comprises establishing a reprojection plane for displaying imagery on a stereo display of a head-mounted display (HMD); determining a position and orientation of the HMD relative to the reprojection plane based on output from an IMU included in the HMD; and reprojecting image data to the stereo display, where such reprojection includes, for each of a plurality of locations on the stereo display, applying a stereo depth treatment to such location which is based on the determined position and orientation of the HMD relative to the reprojection plane. In such an example, or any other example the reprojection plane is additionally or alternatively coincident with a ground plane. In any of the preceding examples, or any other example, the method additionally or alternatively comprises determining the ground plane based on a height of a user wearing the head-mounted display and a gravity vector determined based on output from the IMU. In any of the preceding examples, or any other example, the method additionally or alternatively comprises receiving an updated position and orientation of the HMD relative to the reprojection plane based on output from the IMU; and adjusting the stereo depth treatment for one or more of the locations based on the updated position and orientation of the HMD. In any of the preceding examples, or any other example, the method additionally or alternatively comprises receiving image data of the environment from an outward-facing camera; and reprojecting the received image data of the environment to the stereo display based on the determined position and orientation of the HMD relative to the reprojection plane. In any of the preceding examples, or any other example, the reprojection plane is additionally or alternatively a first reprojection plane and portions of the stereo-display that lie along rays intersecting the user's eye and the first reprojection plane additionally or alternatively get stereo depth treatments based on position and orientation of the HMD relative to the first reprojection plane; and portions of the stereo-display that lie along rays intersecting the user's eye and the second reprojection plane additionally or alternatively get stereo depth treatments based on position and orientation of the HMD relative to the second reprojection plane.

In yet another example, a head-mounted display (HMD), comprises an inertial measurement unit (IMU); an outward facing camera; a stereo display; and a controller configured to: establish a reprojection plane for displaying imagery on the stereo display based on a height of a user wearing the head-mounted display and a gravity vector determined based on output from the IMU; determine a position and orientation of the HMD relative to the reprojection plane based on output from the IMU; receive image data of the environment from the outward facing camera; and reproject the image data of the environment to the stereo display, where such reprojection includes, for each of a plurality of locations on the stereo display, applying a stereo depth treatment to such location which is based on the determined position and orientation of the HMD relative to the reprojection plane.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display (HMD), comprising:
an inertial measurement unit (IMU);
one or more displays; and
a controller configured to:
  establish a reprojection plane for displaying imagery on the one or more displays;
  determine a position and orientation of the HMD relative to the reprojection plane based on output from the IMU; and
  reproject 2D image data to the one or more displays, where such reprojection includes, for each of a plurality of locations on the one or more displays, applying a depth treatment to such location which is based on the determined position and orientation of the HMD relative to the reprojection plane, so that the 2D image data is unprojected based on the depth treatment, and then reprojected for presentation on the one or more displays.

2. The head-mounted display of claim 1, wherein the reprojection plane is coincident with a ground plane.

3. The head-mounted display of claim 2, wherein the ground plane is determined based on a height of a user wearing the HMD and a gravity vector determined based on output from the IMU.

4. The head-mounted display of claim 3, wherein the height of the user is determined based on a user input.

5. The head-mounted display of claim 3, wherein the height of the user is determined based on a population average height.

6. The head-mounted display of claim 3, wherein the height of the user is determined based on output from the IMU.

7. The head-mounted display of claim 1, wherein applying a depth treatment includes, for each such location, adjusting the 2D image data based on a depth value that corresponds to a length of a gaze vector extending from a user pupil position through the location on the one or more displays to the reprojection plane.

8. The head-mounted display of claim 1, wherein the controller is further configured to:
receive an updated position and orientation of the HMD relative to the reprojection plane based on output from the IMU; and
adjust the depth treatment for one or more of the locations based on the updated position and orientation of the HMD.

9. The head-mounted display of claim 1, further comprising an outward-facing camera, and wherein the controller is further configured to:
receive 2D image data of the environment from the outward-facing camera; and
reproject the received 2D image data of the environment to the one or more displays based on the determined position and orientation of the HMD relative to the reprojection plane.

10. The head-mounted display of claim 9, wherein the controller is further configured to:
adjust a position of the reprojection plane relative to the HMD based on the received 2D image data of the environment.

11. The head-mounted display of claim 1, wherein the reprojection plane is a first reprojection plane, and wherein the controller is further configured to establish a second reprojection plane.

12. The head-mounted display of claim 11, wherein
portions of the one or more displays that lie along rays intersecting the user's eye and the first reprojection plane get depth treatments based on position and orientation of the HMD relative to the first reprojection plane; and
portions of the one or more displays that lie along rays intersecting the user's eye and the second reprojection plane get depth treatments based on position and orientation of the HMD relative to the first second reprojection plane.

13. The head-mounted display of claim 1, wherein the one or more displays include a stereo display, and wherein the depth treatment is a stereo depth treatment.

14. A method for reprojecting image data, comprising:
establishing a reprojection plane for displaying imagery on a stereo display of a head-mounted display (HMD);
determining a position and orientation of the HMD relative to the reprojection plane based on output from an IMU included in the HMD; and
reprojecting 2D image data to the stereo display, where such reprojection includes, for each of a plurality of locations on the stereo display, applying a stereo depth treatment to such location which is based on the determined position and orientation of the HMD relative to the reprojection plane, so that the image data is unprojected based on the depth treatment, and then reprojected for presentation on the stereo display.

15. The method of claim 14, wherein the reprojection plane is coincident with a ground plane.

16. The method of claim 15, further comprising:
determining the ground plane based on a height of a user wearing the head-mounted display and a gravity vector determined based on output from the IMU.

17. The method of claim 14, further comprising:
receiving an updated position and orientation of the HMD relative to the reprojection plane based on output from the IMU; and
adjusting the stereo depth treatment for one or more of the locations based on the updated position and orientation of the HMD.

18. The method of claim 14, further comprising:
receiving 2D image data of the environment from an outward-facing camera; and
reprojecting the received 2D image data of the environment to the stereo display based on the determined position and orientation of the HMD relative to the reprojection plane.

19. The method of claim 14, wherein
the reprojection plane is a first reprojection plane and portions of the stereo display that lie along rays intersecting the user's eye and the first reprojection plane get stereo depth treatments based on position and orientation of the HMD relative to the first reprojection plane; and
portions of the stereo-display that lie along rays intersecting the user's eye and the second reprojection plane get stereo depth treatments based on position and orientation of the HMD relative to the second reprojection plane.

20. A head-mounted display (HMD), comprising:
an inertial measurement unit (IMU);
an outward facing camera;
a stereo display; and
a controller configured to:
establish a reprojection plane for displaying imagery on the stereo display based on a height of a user wearing the head-mounted display and a gravity vector determined based on output from the IMU;
determine a position and orientation of the HMD relative to the reprojection plane based on output from the IMU;
receive 2D image data of the environment from the outward facing camera; and
reproject the received 2D image data of the environment to the stereo display, where such reprojection includes, for each of a plurality of locations on the stereo display, applying a stereo depth treatment to such location which is based on the determined position and orientation of the HMD relative to the reprojection plane, so that the 2D image is unprojected based on the depth treatment, and then reprojected for presentation on the stereo display.

* * * * *